(12) United States Patent
Sharma et al.

(10) Patent No.: US 11,977,611 B2
(45) Date of Patent: May 7, 2024

(54) DIGITAL RIGHTS MANAGEMENT PLATFORM

(71) Applicant: Mastercard International Incorporated, Purchase, NY (US)

(72) Inventors: Prashant Sharma, Madison, NJ (US); Liang Tian, Rye Brook, NY (US); Bryn Anthony Robinson-Morgan, Mosborough Village (GB)

(73) Assignee: Mastercard International Incorporated, Purchase, NY (US)

( * ) Notice: Subject to any disclaimer, the term of this patent is extended or adjusted under 35 U.S.C. 154(b) by 44 days.

(21) Appl. No.: 17/075,592

(22) Filed: Oct. 20, 2020

(65) Prior Publication Data

US 2022/0121730 A1 Apr. 21, 2022

(51) Int. Cl.
*G06F 21/32* (2013.01)
*G06F 21/10* (2013.01)

(52) U.S. Cl.
CPC ....... *G06F 21/105* (2013.01); *G06Q 2220/18* (2013.01)

(58) Field of Classification Search
CPC .......................... G06F 21/105; G06Q 2220/18
See application file for complete search history.

(56) References Cited

U.S. PATENT DOCUMENTS

| | | |
|---|---|---|
| 6,011,858 A | 1/2000 | Stock et al. |
| 6,182,892 B1 | 2/2001 | Angelo et al. |

(Continued)

FOREIGN PATENT DOCUMENTS

| | | |
|---|---|---|
| CN | 101485128 A | 7/2009 |
| CN | 102063612 A | 5/2011 |

(Continued)

OTHER PUBLICATIONS

"A Framework for Analyzing Template Security and Privacy in Biometric Authentication Systems", Koen Simoens, IEEE Transactions on Information Forensics and Security, vol. 7, No. 2, Apr. 2012 (Year: 2012).*

(Continued)

*Primary Examiner* — Jamie R Kucab
*Assistant Examiner* — Duan Zhang
(74) *Attorney, Agent, or Firm* — Pramudji Law Group PLLC; Ari Pramudji

(57) ABSTRACT

Various implementations described herein may refer to a digital rights management (DRM) platform. In one implementation, a method may include receiving first biometric data associated with a user. The method may also include generating first biometric templates based on the first biometric data using a DRM platform. The method may further include receiving access control data from the user, where the access control data includes data indicating time periods during which requestors are permitted to authenticate the user using the first biometric templates. The method may additionally include transmitting the first biometric templates and the access control data to the requestors using the DRM platform, where the first biometric templates are configured to be compared to second biometric templates based on the access control data, and where the second biometric templates are configured to be generated using the DRM platform based on second biometric data associated with the user.

18 Claims, 10 Drawing Sheets

(56) References Cited

U.S. PATENT DOCUMENTS

| | | | |
|---|---|---|---|
| 6,655,585 B2 | 12/2003 | Shinn | |
| 7,142,699 B2 | 11/2006 | Reisman et al. | |
| 7,606,790 B2 | 10/2009 | Levy | |
| 8,200,980 B1 | 6/2012 | Robinson et al. | |
| 8,706,634 B2 | 4/2014 | Evans et al. | |
| 8,930,276 B2 | 1/2015 | Thieme et al. | |
| 9,245,165 B2 | 1/2016 | Slaby et al. | |
| 9,355,236 B1 | 5/2016 | Kratz et al. | |
| 9,646,146 B2 | 5/2017 | LaCous et al. | |
| 9,774,596 B2 * | 9/2017 | Mandal | G06F 21/32 |
| 10,142,333 B1 | 11/2018 | Griffin et al. | |
| 10,248,954 B2 | 4/2019 | Jin et al. | |
| 10,282,532 B2 | 5/2019 | Weber et al. | |
| 10,432,667 B2 | 10/2019 | Hubbard et al. | |
| 10,476,862 B2 | 11/2019 | Kamal | |
| 10,530,755 B2 | 1/2020 | Bhattacharjee et al. | |
| 10,546,119 B2 | 1/2020 | Kamal | |
| 10,558,963 B2 | 2/2020 | Desai et al. | |
| 10,575,179 B2 | 2/2020 | Unnerstall et al. | |
| 10,581,727 B2 | 3/2020 | Nowak | |
| 10,586,224 B2 | 3/2020 | Tanner et al. | |
| 10,650,632 B2 | 5/2020 | Kamal et al. | |
| 10,659,230 B2 | 5/2020 | Lin | |
| 10,659,458 B2 | 5/2020 | Valenti et al. | |
| 10,673,831 B2 | 6/2020 | Sahraei et al. | |
| 10,693,650 B2 | 6/2020 | Wease et al. | |
| 10,699,275 B2 | 6/2020 | Allen et al. | |
| 10,715,520 B2 | 7/2020 | Bhatt et al. | |
| 10,769,433 B2 | 9/2020 | Nowak et al. | |
| 10,824,714 B2 | 11/2020 | Beatson et al. | |
| 2002/0095587 A1 | 7/2002 | Doyle et al. | |
| 2005/0137977 A1 | 6/2005 | Wankmueller | |
| 2006/0112280 A1 * | 5/2006 | Cohen | G06V 40/10 713/186 |
| 2008/0049987 A1 | 2/2008 | Champagne et al. | |
| 2008/0123909 A1 | 5/2008 | Kim et al. | |
| 2013/0108125 A1 | 5/2013 | Storm et al. | |
| 2013/0228616 A1 | 9/2013 | Bhosie et al. | |
| 2014/0072188 A1 * | 3/2014 | Liu | G06V 10/95 382/125 |
| 2015/0127553 A1 | 5/2015 | Sundaram et al. | |
| 2015/0213351 A1 | 7/2015 | Wyatt | |
| 2016/0226837 A1 | 8/2016 | Kim | |
| 2016/0283706 A1 | 9/2016 | Holmes | |
| 2017/0124445 A1 | 5/2017 | Howard | |
| 2017/0264599 A1 | 9/2017 | O' Regan et al. | |
| 2018/0247385 A1 | 8/2018 | Whitfield et al. | |
| 2019/0020651 A1 | 1/2019 | Soon-Shiong et al. | |
| 2019/0080326 A1 | 3/2019 | Treivedi et al. | |
| 2019/0320039 A1 * | 10/2019 | Kamal | H04L 63/0861 |
| 2020/0151431 A1 * | 5/2020 | Hassan | G06F 21/32 |
| 2020/0281470 A1 * | 9/2020 | Nakajima | G06F 21/6245 |
| 2020/0311451 A1 | 10/2020 | Wu | |
| 2021/0035666 A1 * | 2/2021 | Trelin | G06F 16/1748 |

FOREIGN PATENT DOCUMENTS

| | | | | |
|---|---|---|---|---|
| CN | 104639517 A | | 5/2015 | |
| CN | 108092991 A | * | 5/2018 | B60R 16/023 |
| EP | 3376454 A | | 9/2018 | |
| WO | 2015073860 A2 | | 5/2015 | |
| WO | WO-2018222211 A1 | * | 12/2018 | G06F 21/32 |

OTHER PUBLICATIONS

PCT/US2021/053883, International Search Report and Written Opinion dated Dec. 23, 2021.

Office Action from Intellectual Property India; IN 201911014086; dated Jan. 28, 2021.

Henniger, et al.; Extending EMV Payment Smart Cards with Biometric On-Card Verification; 3rd Policies and Research in Identity Management (IDMAN); pp. 121-130I Apr. 2013.

CNIPA Office Action; CN 201811030745.7; dated Feb. 10, 2021.

CNIPA Second Office Action; CN 201811030745.7; dated Aug. 26, 2021.

MasterCard Certifies AnywhereCommerce's Nomad 2.0 Payment Acceptance Device; https://www.anywherecommerce.com/mastercard-certifies-anywherecommerces-nomad-2-0-payment-acceptance-device, pp. 1-5; published Jan. 2015; AnywhereCommerce.

The Federal Reserve Payments Study 2016; https://www.federalreserve.gov/newsevents/press/other/2016-payments-study-20161222.pdf; pp. 1-12; published Dec. 2016; A Federal Reserve System publication.

* cited by examiner

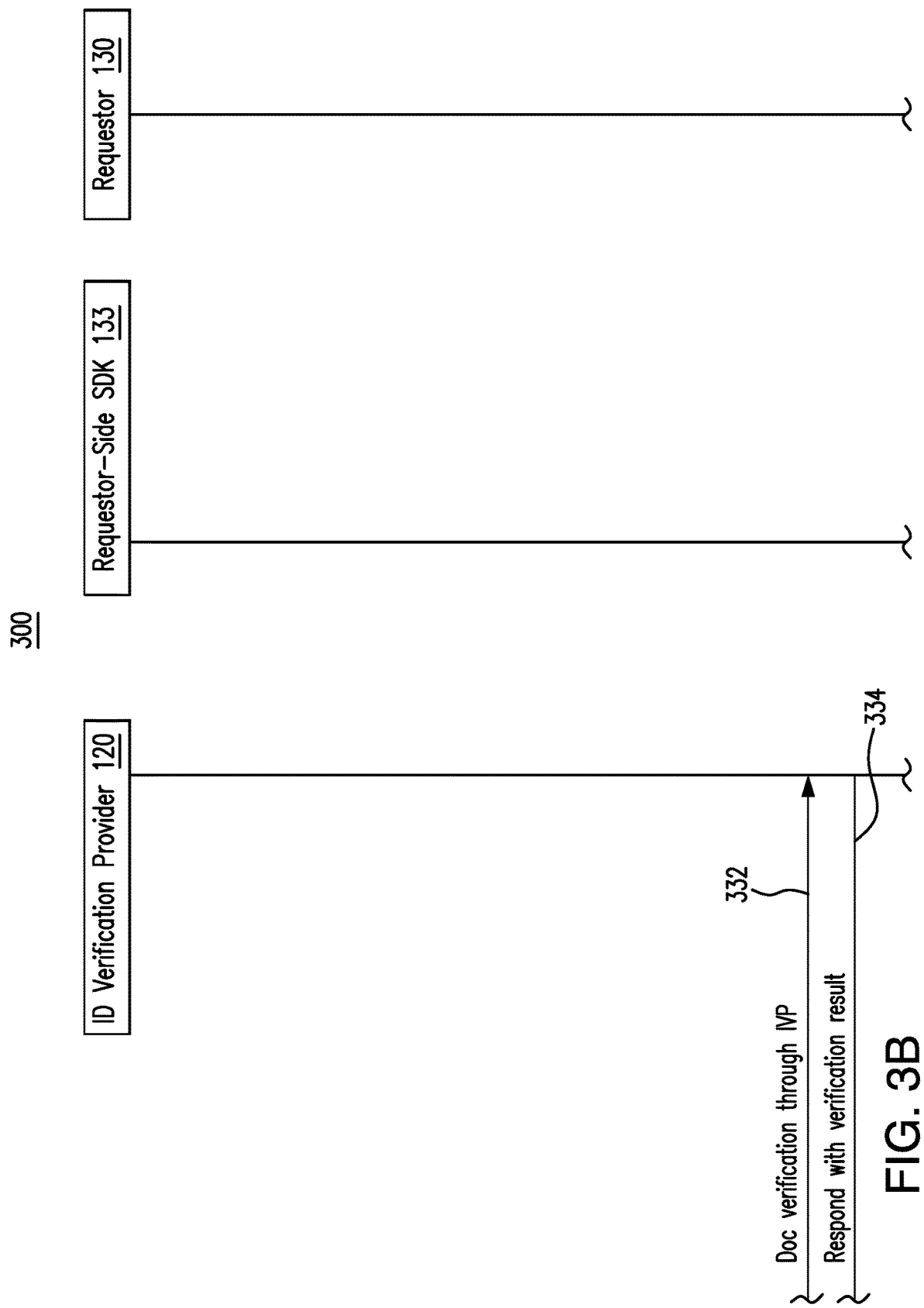

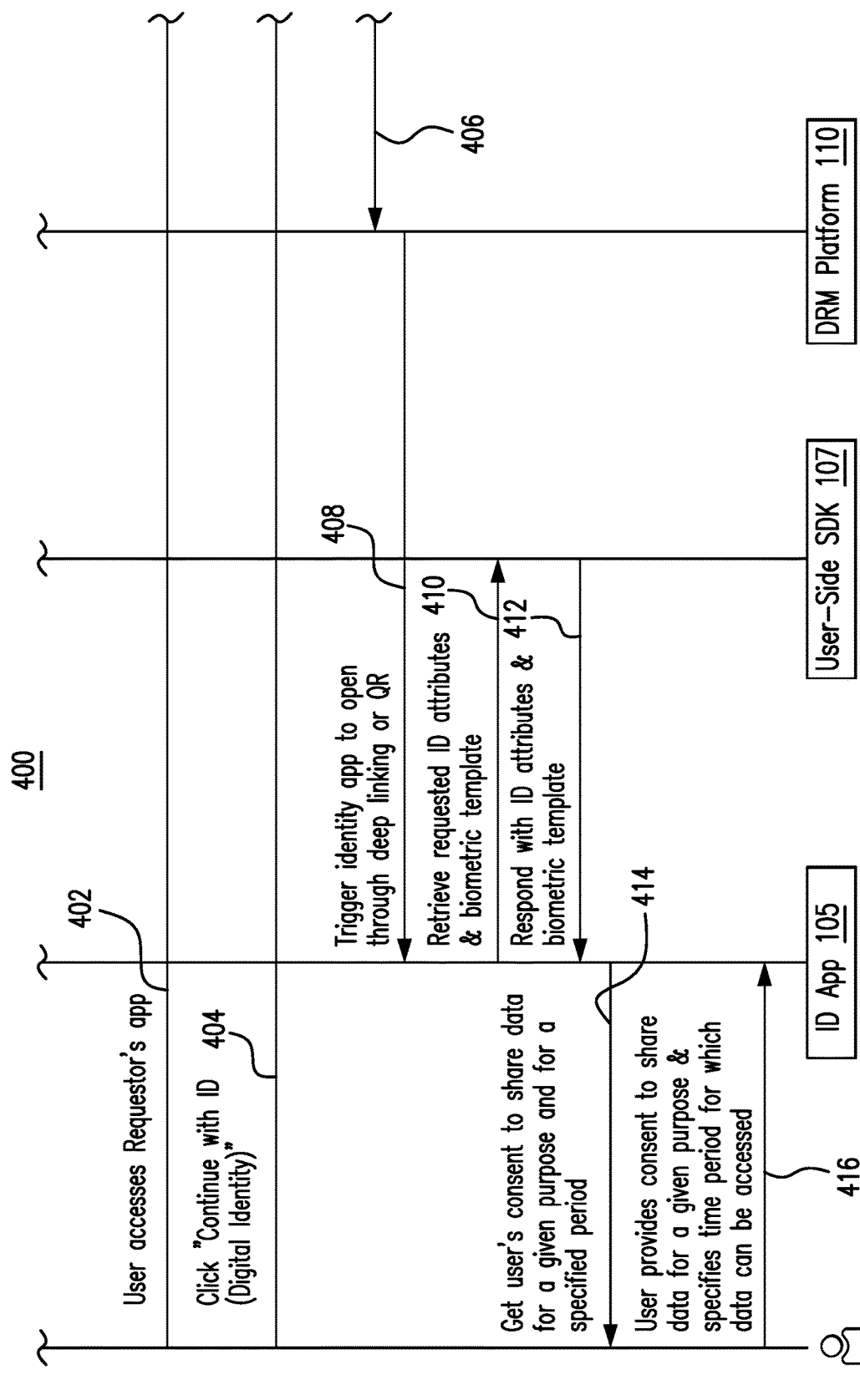

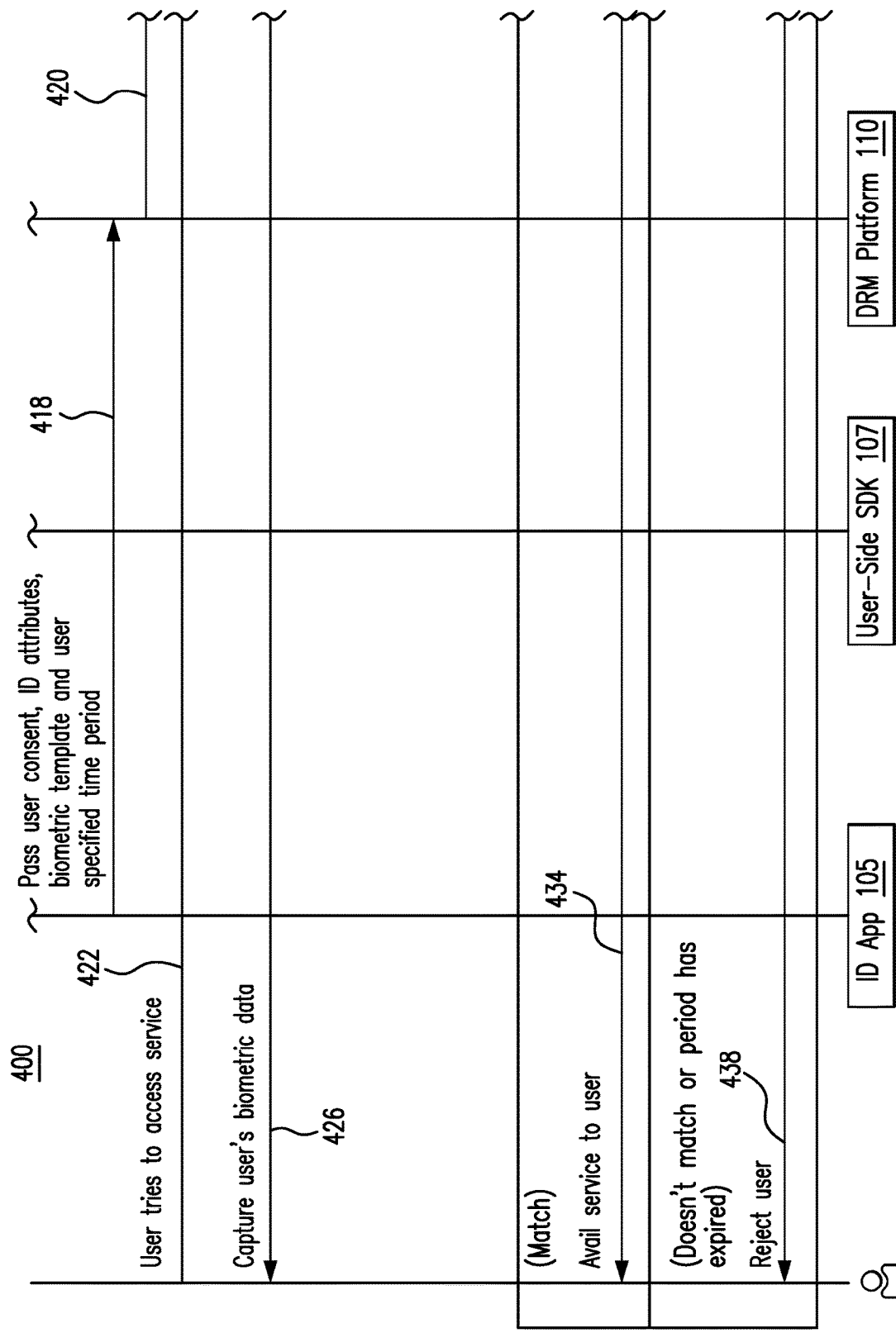

DIGITAL RIGHTS MANAGEMENT PLATFORM

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

An individual may be asked for proof of identity (i.e., proof that the individual is who the individual claims to be) in a variety of scenarios. For example, an entity may ask the individual for proof of identity before permitting the individual to access a physical location (e.g., a room, building, or facilities), to access a mode of transportation (e.g., an airplane or train), to use a payment account (e.g., a bank account or credit card account), and/or the like. In some scenarios, the entity may use the individual's biometric data in order to verify the identity of the individual.

SUMMARY

Described herein are implementations of various technologies relating to a digital rights management platform. In one implementation, a method may include receiving first biometric data associated with a user. The method may also include generating one or more first biometric templates based on the first biometric data using a digital rights management (DRM) platform. The method may further include receiving access control data from the user, where the access control data includes data indicating one or more time periods during which one or more requestors are permitted to authenticate the user using the one or more first biometric templates. The method may additionally include transmitting the one or more first biometric templates and the access control data to the one or more requestors using the DRM platform, where the one or more first biometric templates are configured to be compared to one or more second biometric templates based on the access control data, and where the one or more second biometric templates are configured to be generated using the DRM platform based on second biometric data associated with the user.

In another implementation, the method may include receiving one or more first biometric templates generated based on first biometric data associated with a user and generated using a digital rights management (DRM) platform. The method may also include receiving access control data associated with the user, where the access control data includes data indicating one or more time periods during which one or more requestors are permitted to authenticate the user using the one or more first biometric templates. The method may further include generating authentication data based on the access control data. Generating the authentication data based on the access control data may include receiving second biometric data associated with the user, generating one or more second biometric templates based on the second biometric data using the DRM platform, comparing the one or more first biometric templates and the one or more second biometric templates, and generating the authentication data based on the comparison.

In yet another implementation, a method may include receiving first biometric data associated with a user. The method may also include generating one or more first biometric templates based on the first biometric data. The method may further include receiving access control data from the user, where the access control data includes data indicating one or more time periods during which one or more requestors are permitted to authenticate the user using the one or more first biometric templates. The method may additionally include receiving a request for the one or more first biometric templates from the one or more requestors. In addition, the method may include transmitting the one or more first biometric templates to the one or more requestors based on the access control data, where the one or more first biometric templates are configured to be compared to one or more second biometric templates based on the access control data, and where the one or more second biometric templates are configured to be generated based on second biometric data associated with the user.

The above referenced summary section is provided to introduce a selection of concepts in a simplified form that are further described below in the detailed description section. The summary is not intended to identify key{XE "Narrowing designation: key"} features or essential{XE "Narrowing designation: essential"} features of the claimed subject matter, nor is it intended to be used to limit the scope of the claimed subject matter. Furthermore, the claimed subject matter is not limited to implementations that solve any or all{XE "Narrowing designation: all"} disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only{XE "Narrowing designation: only"} the various implementations described herein and are not meant to limit the scope of various techniques described herein.

FIGS. 3A-3D illustrate a sequencing diagram in accordance with implementations of various techniques described herein.

FIGS. 4A-4D illustrate a sequencing diagram in accordance with implementations of various techniques described herein.

DETAILED DESCRIPTION

Figure 1:
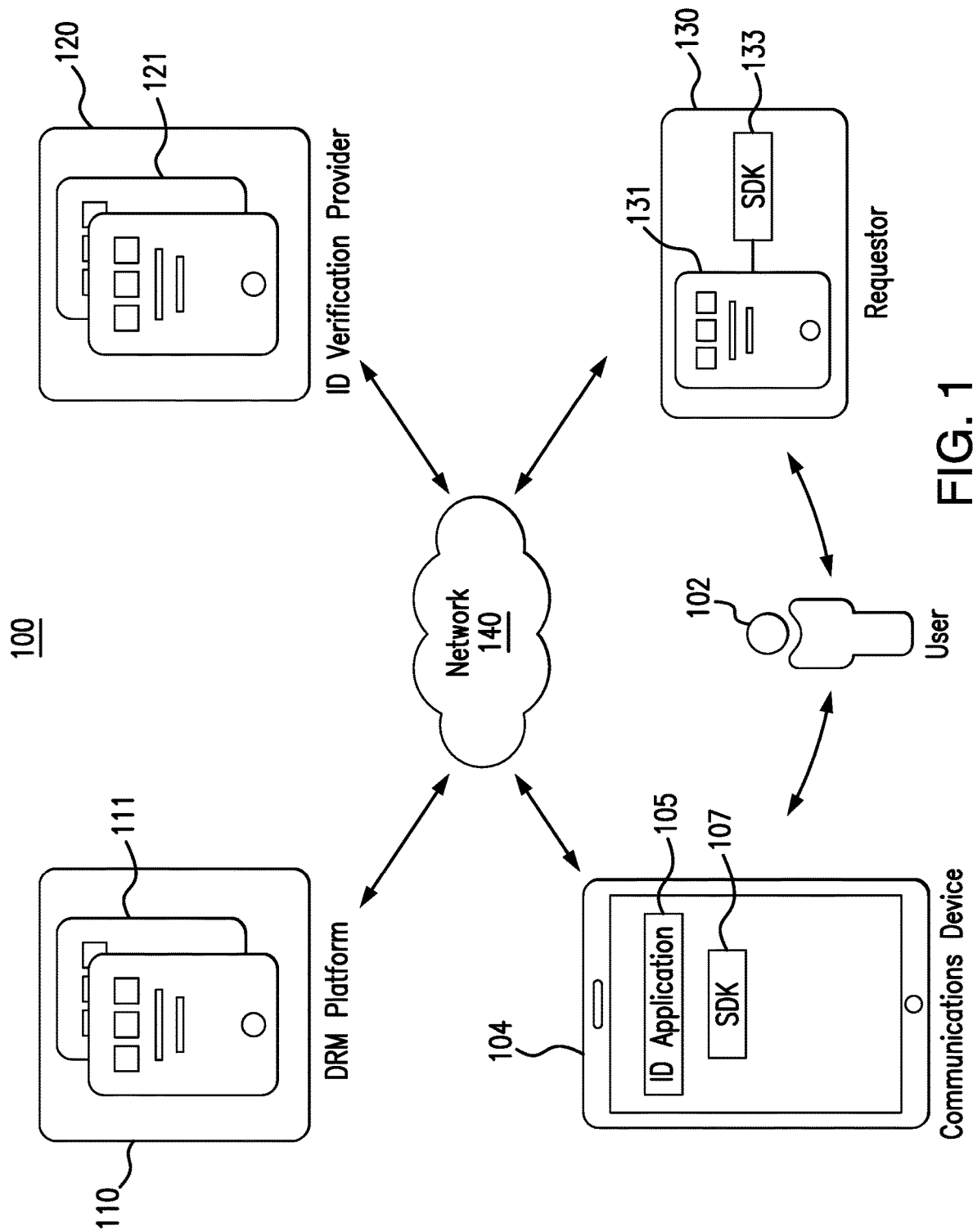
FIG. 1 illustrates a schematic diagram of a system using a DRM platform in accordance with implementations of various techniques described herein.

Various implementations directed to a digital rights management platform will now be described in the following paragraphs with reference to FIGS. 1-4.

An entity may ask an individual for proof in order to verify the identity of the individual, where such proof of identity may corroborate that the individual is who the individual claims to be. "Verifying an identity of an individual" may also be referred to as "identity verification," "authentication," and/or "authenticating an individual," and these terms/phrases may be used interchangeably. An entity may include a merchant, a service provider, a government agency, and/or any other entity known to those skilled in the art.

In particular, the entity may ask the individual for proof of identity before permitting the individual to access resources provided by or managed by the entity. Such resources may include goods, services, a physical location (e.g., a room, building, or facilities), a device, a mode of transportation (e.g., a vehicle, an airplane, or a train), a payment account (e.g., a bank account or credit card account), and/or the like. Examples of an entity asking an individual for proof of identity may include, but are not limited to, the following: a government agency asking for proof of identity before permitting the individual to board an airplane or to enter a country; an operator of an airport lounge asking for proof of identity before permitting the individual to enter the lounge; and, a merchant asking for proof of identity before allowing the individual to use a payment account (e.g., a bank account or credit card account) to purchase goods.

Biometric data may be used to verify the identity of an individual or, in some cases, may be used to supplement other proof of identity (e.g., photo identification, username and password, and/or the like) for the individual. Biometric data may include any data relating to one or more characteristics of an individual, such as characteristics relating to physiology, chemistry, and/or behavior. Examples of biometric data may include, but are not limited to, data relating to one or more of the following characteristics: fingerprint, palm veins, finger veins, facial features, DNA, palm prints, hand geometry, iris features, retinal features, odor, typing rhythm, gait, and voice. Any type of biometric data known to those skilled in the art may be used.

To verify an individual's identity using biometric data, a biometric sample of the individual may initially be captured using equipment known to those skilled in the art, such as a camera, a biometric sensor, and/or the like. Biometric data corresponding to the captured biometric sample may then be provided to the entity seeking to authenticate the individual. The entity may use this biometric data to perform an authentication of the individual before permitting the individual to access its resources. In some instances, the entity may authenticate the individual via a comparison of the biometric data with subsequently-captured biometric data from the individual.

However, in certain implementations, once the biometric data is provided to the entity, the individual may not be able to control the entity's use of the data. In particular, the individual may have little to no control as to how the entity uses the biometric data, how long the entity stores the biometric data, how long the entity is able to access the biometric data, and/or whether the entity shares the biometric data with third parties (e.g., a government agency).

In view of the above, various implementations for a digital rights management (DRM) platform are described herein, where the DRM platform may be used for identity verification. In some implementations, the DRM platform may be used to generate a biometric template corresponding to biometric data of an individual. Via the DRM platform, an entity may verify the identity of the individual using the biometric template based on access control data provided by the individual. The access control data may indicate a time period during which the entity is permitted to authenticate the individual using the biometric template. In particular, using the DRM platform, the entity may authenticate the individual based on a comparison of the biometric template with another template generated from subsequently-captured biometric data of the individual. However, the entity may be denied permission to authenticate the individual using the initially-provided biometric template once the time period indicated by the access control data has expired. As such, the DRM platform may be used to limit an entity's access to biometric data for an individual, while also helping the individual to manage the entity's use of the individual's biometric template.

FIG. 1 illustrates a schematic diagram of a system 100 using a DRM platform 110 in accordance with implementations of various techniques described herein. The system 100 may include a communications device 104 operated by a user 102, the DRM platform 110, an identity verification provider 120, a requestor 130, and a network 140.

In particular, the communications device 104, the DRM platform 110, the identity verification provider 120, and the requestor 130 may be in communication with one another via the network 140. The network 140 may include, but is not limited to, one or more of the following components: a local area network (LAN), a wide area network (WAN) (e.g., the Internet), a mobile network, a virtual network, and/or any other public and/or private network known in the art capable of supporting communication among two or more of the elements of the system 100.

The user 102 may be an individual seeking to avail himself or herself of one or more resources provided by or managed by the requestor 130. The requestor 130 may be a merchant, a service provider, a government agency, and/or any other entity known to those skilled in the art. As noted above, the one or more resources may include goods, services, a device, a physical location (e.g., a room, a building, or facilities), a mode of transportation (e.g., a vehicle, an airplane, or a train), a payment account (e.g., a bank account, a credit card account, or a savings account), and/or any other resource known to those skilled in the art.

The requestor 130 may be similar to the entity described above in that the requestor 130 may seek to verify the identity of the user 102 before permitting the user 102 to access the one or more resources. In particular, the requestor 130 may seek to authenticate the user 102 by requesting that the user 102 provide one or more forms of identification (i.e., proof of identity). As similarly described above, examples of a requestor 130 requesting proof of identity from the user 102 may include, but are not limited to, the following: a government agency requesting proof of identity before permitting the user 102 to enter a country; an airline requesting proof of identity before permitting the user 102 to board an airplane; an operator of an airport lounge requesting proof of identity before permitting the user 102 to enter a lounge; a rental car company requesting proof of identity before permitting the user 102 to obtain a vehicle; a hotel requesting proof of identity before permitting the user 102 to check into a hotel room; and/or, a merchant requesting proof of identity before allowing the user 102 to use a payment account (e.g., a bank account or credit card account) to purchase goods.

As also mentioned above, biometric data associated with the user 102 may be used as proof of identity. The biometric data may include data relating to one or more characteristics of an individual, such as characteristics relating to physiology, chemistry, and/or behavior. Any type of biometric data known to those skilled in the art may be used. As similarly described above, examples of biometric data may include, but are not limited to, data relating to one or more of the following characteristics: fingerprint, palm veins, finger veins, facial features, DNA, palm prints, hand geometry, iris features, retinal features, odor, typing rhythm, gait, and voice. Other forms of proof of identity may also be used in conjunction with the biometric data, such as, but not limited to, the following: a government-issued identification card (e.g., a social security card), a passport, a driver's license, and/or the like.

The DRM platform 110 may be operated by and/or provided by an entity in order to facilitate the identity verification of the user 102 for the requestor 130, where the entity may be unrelated to the user 102 and/or the requestor 130. The DRM platform 110 may be a software-based system, a hardware-based system, or combinations thereof. In particular, the DRM platform 110 may include, and/or may be implemented using, one or more computing devices 111. The one or more computing devices 111 may include any computing device known to those skilled in the art, such as one or more servers. Various implementations of the one or more computing devices 111 are discussed later with respect to FIG. 2.

In one implementation, the DRM platform 110 may be configured to perform one or more operations as described herein in conjunction with applications developed using one or more software development kits (SDKs), where such applications may include a user-side SDK application 107 of the communications device 104 and a requestor-side SDK application 133 associated with the requestor 130. The entity providing the DRM platform 110 may also provide the one or more SDKs used to develop these applications. In particular, the one or more SDKs may include a set of tools (e.g., one or more application programming interfaces (APIs), utilities, patterns, interfaces, Extensible Markup Language (XML) definitions, abstractions, and/or the like), where these tools may be used and/or followed to create one or more applications that run within and/or in conjunction with the DRM platform 110.

As further explained below, the DRM platform 110, through its interactions with the SDK applications, may be used to create digital identity data for the user 102 and/or the communications device 104, generate a biometric template associated with the user 102, and facilitate an authentication of the user 102 by the requestor 130 based on the biometric template and access control data provided by the user 102. The access control data may include data indicating one or more time periods during which the requestor 130 is permitted to authenticate the user 102 using the biometric template.

The DRM platform and the elements of the system 100 may communicate with one another using any technique known to those skilled in the art. In some implementations, though not shown in FIG. 1, the DRM platform 110, the communications device 104, the identity verification provider 120, and the requestor 130 may each communicate with one another using one or more APIs.

The communications device 104 may be operated by and/or associated with the user 102. The communications device 104 may be any computing device known to those skilled in the art, including a mobile device as shown in FIG. 1. Various implementations of the communications device 104 are discussed later with respect to FIG. 2.

The communications device 104 may be configured to perform one or more operations as described herein using one or more applications downloaded to, installed in, and/or active in the device 104. Such applications may include an identity application 105 and the user-side SDK application 107. In one implementation, the identity application 105 may be used to manage the digital identity data for the user 102 and/or the device 104, among other functions. The digital identity data may include data relating to a digital identity of the user 102, and may include a unique identifier, a unique public and private encryption key pair for the identifier, data relating to proof of identity for the user 102, and/or the like. In another implementation, the user-side SDK application 107 may be used to facilitate interactions between the identity application 105 and the DRM platform 110, among other functions.

In particular, the identity application 105 and the user-side SDK application 107 may, either alone or in combination, be used to facilitate the identity verification of the user 102 for the requestor 130, such as during an enrollment process or advance share process described below. For example, the identity application 105 and the user-side SDK application 107 may, in conjunction with the DRM platform 110, be used to: display one or more interfaces on the device 104 for the user 102; create digital identity data for the user 102 and/or the communications device 104; acquire biometric data for the user 102 using biometric equipment (e.g., a camera, a biometric sensor, and/or the like); generate a biometric template associated with the user 102 based on the acquired biometric data; receive access data from the user 102; and/or, transmit the digital identity data, the biometric template, or the access control data via the network 140 to one or more other elements of the system 100.

In some implementations, an entity providing the identity application 105 may be independent, such that it is unrelated to either the requestor 130 or to the entity providing the DRM platform 110. In another implementation, the entity providing the identity application 105 may be the same as and/or related to the requestor 130. In yet another implementation, the entity providing the identity application 105 may be the same as and/or related to the entity providing the DRM platform 110. In addition, the entity providing the DRM platform 110 may be unrelated to the requestor 130.

The user-side SDK application 107 may be incorporated, in whole or in part, into the identity application 105. In some implementations, the user-side SDK application 107 may be incorporated into the identity application 105 such that the user 102 may be unaware of the functionalities of the user-side SDK application 107 on the device 104. The user-side SDK application 107 may be an application, a widget, or any other software-based implementation known to those skilled in the art.

As mentioned above, the entity providing the DRM platform 110 may also provide the one or more SDKs used to develop the user-side SDK application 107. As such, in some implementations, an entity, such as the requestor 130 or an independent entity, may use the one or more SDKs to incorporate the user-side SDK application 107 into its identity application 105. In another implementation, the identity application 105 and the user-side SDK application 107 may be combined into a single application and developed by the same entity providing the DRM platform 110.

As noted above, the requestor 130 may be a merchant, a service provider, a government agency, and/or any other entity known to those skilled in the art. The requestor 130 may operate one more computing devices 131, which may include any computing device known to those skilled in the art. For example, the one or more computing devices 131 may include one or more servers located remotely, one or more kiosk machines located on site, and/or the like. Various implementations of the one or more computing devices 131 are discussed later with respect to FIG. 2.

The one or more computing devices 131 may be configured to perform one or more operations as described herein using one or more applications downloaded to, installed in, and/or active in the one or more computing devices 131. Such applications may include the requestor-side SDK application 133. In one implementation, the requestor-side SDK application 133 may be used to manage interactions between the one or more computing devices 131 and the DRM platform 110, among other functions.

In particular, the requestor-side SDK application 133 may be used to facilitate the identity verification of the user 102 for the requestor 130, such as during the advance share process and/or the identity verification process described below. For example, the requestor-side SDK application 133 may, in conjunction with the DRM platform 110, be used to: display one or more interfaces on the one or more computing devices 131 for the user 102; acquire biometric data for the user 102 using biometric equipment (e.g., a camera, a biometric sensor, and/or the like); generate a biometric template associated with the user 102 based on the acquired biometric data; compare biometric templates associated with the user 102; and/or generate authentication data based on the comparison and on the access control data from the user 102.

As mentioned above, the entity providing the DRM platform 110 may also provide the one or more SDKs used to develop the requestor-side SDK application 133. As such, in some implementations, the requestor 130 may use the one or more SDKs to incorporate, in whole or in part, the requestor-side SDK application 133 into the one or more applications of its computing devices 131. In some implementations, the requestor-side SDK application 133 may be incorporated into the one or more applications such that the user 102 operating the computing devices 131 may be unaware of the functionalities of the requestor-side SDK application 133. The requestor-side SDK application 133 may be an application, a widget, or any other software-based implementation known to those skilled in the art.

The identification verification provider 120 may be an entity used to validate one more types of proof of identity submitted by the user 102. In one implementation, the identification verification provider 120 may be independent from and/or unrelated to the entities described above. The identification verification provider 120 may operate one more computing devices 121, which may include any computing device known to those skilled in the art, such as one or more servers. Various implementations of the one or more computing devices 121 are discussed later with respect to FIG. 2. In particular, the identification verification provider 120 may validate and/or check the quality of proof of identity submitted by the user 102 based on any factor known to those skilled in the art. Those factors may include, but are not limited to, the following: image quality; corroboration with social data, financial data, and/or mobile operator network data; one or more machine learning algorithms; and/or the like.

In some implementations, the identification verification provider 120 may be optional in the system 100. Moreover, although the system 100 is presented in one arrangement, other implementations may include one or more elements of the system 100 in different arrangements and/or with additional elements. For example, though one requestor 130 is shown in FIG. 1, those skilled in the art will understand that the implementations described herein may be applied to a plurality of requestors 130. In another example, though one user 102 is shown in FIG. 1, those skilled in the art will understand that the implementations described herein may be applied to a plurality of users 102.

In operation, the system 100 may be used to facilitate the identity verification of the user 102 for the requestor 130. In particular, the user 102 may use one or more elements of the system 100 (e.g., the DRM platform 110) to provide biometric data and/or access control data for use in authenticating the user 102 for the requestor 130. As mentioned above, the access control data may include data indicating one or more time periods during which the requestor 130 is permitted to authenticate the user 102 using this biometric data.

As stated above, the user 102 may seek to avail himself or herself of one or more resources provided by or managed by the requestor 130. Prior to an interaction between the user 102 and the requestor 130, the user 102 may download, install, and/or activate the identity application 105 and the user-side SDK application 107 in the communications device 104. As noted above, the user-side SDK application 107 may be incorporated, in whole or in part, into the identity application 105.

The user 102 may then initiate an enrollment process using the identity application 105 and the user-side SDK application 107. In one implementation, the user 102 may use the applications to create digital identity data for the user 102 and/or the device 104. The digital identity data may include data relating to a digital identity of the user 102, and may include a unique identifier, a unique public and private encryption key pair for the identifier, and/or the like.

In such an implementation, device 104 (via the identity application 105 and/or the user-side SDK application 107) may transmit the digital identity data to the DRM platform 110 via the network 140, where the DRM platform 110 may create a user account corresponding to the digital identity data. The user account and digital identity data may be stored in a memory associated with the one or more computing devices 111. In another implementation, the identity application 105 and/or the user-side SDK application 107 may be used to create a user account corresponding to the digital identity data, and the applications may store the user account and digital identity data in a memory of the communications device 104.

As part of the enrollment process, the device 104, through the identity application 105 and/or the user-side SDK application 107, may display a prompt indicating that the user 102 is to provide one or more identification documents (i.e., proof of identity). Such documents may include a government-issued identification card (e.g., a social security card), a passport, a driver's license, and/or the like. In one implementation, the communications device 104 may acquire one or more images of the one or more identification documents using equipment included in and/or connected to the device 104. Such equipment may include a camera, a scanner, and/or any other device known to those skilled in the art.

In one such implementation, the identity application 105 and/or the user-side SDK application 107 may store the one or more acquired images in a memory of the device 104. In a further implementation, the device 104 (via the identity application 105 and/or the user-side SDK application 107) may transmit the one or more acquired images to the identification verification provider 120 for validation. In another implementation, the identity application 105 and/or the user-side SDK application 107 may validate the one or more acquired images at the device 104, such as through one or more machine learning algorithms. In either implementation, a validation result may be provided to the identity application 105 and/or the user-side SDK application 107.

In response to a successful validation result for the one or more acquired images, the enrollment process may continue. In one implementation, the device 104, through the identity application 105 and/or the user-side SDK application 107, may display a prompt indicating that the user 102 is to provide one or more types of biometric data. As noted above, biometric data may include, but is not limited to, data relating to one or more of the following characteristics:

fingerprint, palm veins, finger veins, facial features, DNA, palm prints, hand geometry, iris features, retinal features, odor, typing rhythm, gait, and voice.

In one implementation, the communications device 104 may acquire the biometric data using equipment included in and/or connected to the device 104. Such equipment may include a camera, a biometric sensor (e.g., fingerprint sensor, iris scanner, palm scanner, and/or the like), and/or any other device configured to acquire biometric data. The identity application 105 and/or the user-side SDK application 107 may store the acquired biometric data in a memory of the device 104.

In a further implementation, the device 104 (via the identity application 105 and/or the user-side SDK application 107) may transmit the acquired biometric data to the identification verification provider 120 for validation. In another implementation, the identity application 105 and/or the user-side SDK application 107 may validate the acquired biometric data at the device 104, such as through one or more machine learning algorithms. In either implementation, a validation result may be provided to the identity application 105 and/or the user-side SDK application 107.

In response to a successful validation result for the acquired biometric data, the identity application 105 and/or the user-side SDK application 107, in conjunction with the DRM platform 110, may convert the acquired biometric data into one or more first biometric templates, such as through the use of a one-way function. In one implementation, the one or more first biometric templates may be generated using a one-way hash algorithm (e.g., Secure Hash Algorithm 1 (SHA-1), MD5 message-digest algorithm, and/or the like), where each biometric template may represent a hashed value. In one such implementation, the DRM platform 110 may be used to convert the acquired biometric data to the one or more first biometric templates. In another implementation, the communications device 104 may be used to convert the acquired biometric data to the one or more first biometric templates. In some implementations, a biometric template may be generated for each type of biometric data acquired from the user 102. In other implementations, a single biometric template may represent a plurality of types of biometric data acquired from the user 102.

Using the identity application 105 and/or the user-side SDK application 107, the one or more first biometric templates may be stored at a memory of the DRM platform 110 and/or a memory of the device 104. In particular, the one or more first biometric templates may be signed or encrypted using the public and private encryption key pair and stored as part of the digital identity data, along with the one or more acquired images mentioned above. In a further implementation, the digital identity data may also include other data relating to the user 102, such as identification information (e.g., name and/or address), financial information (e.g., credit card number and/or bank account number), rewards information (e.g., frequent flyer number), and/or the like. In another implementation, upon successfully storing the digital identity data, including the one or more first biometric templates, the device 104 may (via the identity application 105 and/or the user-side SDK application 107) display a prompt indicating that the enrollment process was successful.

After a successful completion of the enrollment process and prior to attempting to access the one or more resources provided by or managed by the requestor 130, the user 102 may initiate an advance share process. In one implementation, the user 102 may initiate the advance share process by contacting the requestor 130 using the device 104 (via the identity application 105 and/or the user-side SDK application 107). In particular, using these applications, the user 102 may contact the requestor 130 via one or more software-based systems (e.g., website, mobile application, and/or the like) implemented through the one or more computing devices 131. In such an implementation, the user 102 may communicate the date and/or time when the user 102 will attempt to access the one or more resources. For example, one day before checking into a hotel for use of a hotel room (i.e., the resource), the user 102 may contact the hotel operator (i.e., the requestor 130) through a mobile application of the hotel operator. The user 102 may confirm to the hotel operator that the user 102 intends to check into the hotel room on the next day at a specific time.

In response to the communication from the user 102, the requestor 130 may request to access all or part of the digital identity data of the user 102, including the one or more first biometric templates. The requestor 130 may use the digital identity data to perform an identity verification when the user 102 attempts to access the one or more resources. The requestor 130 may transmit the request to the device 104 via the DRM platform 110, the identity application 105, the user-side SDK application 107, or combinations thereof.

The device 104 may (via the identity application 105 and/or the user-side SDK application 107) display a prompt indicating that the requestor 130 is requesting access to the digital identity data. The device 104 may receive consent data from the user 102 via an interface provided by the identity application 105 and/or the user-side SDK application 107. The consent data may include data indicating that the user 102 consents to use of the digital identity data, including the one or more first biometric templates, by the requestor 130. In particular, the consent data may also include data indicating what portion of the digital identity data may be used (e.g., the one or more first biometric templates, one or more acquired images, and/or the like) and may include data indicating that access is permitted only for the requestor 130.

The device 104 may also receive the access control data from the user 102 via the interface. As mentioned above, the access control data may indicate a time period during which the requestor 130 is permitted to authenticate the user 102 using the one or more first biometric templates. For example, the access control data may indicate that the requestor 130 has a 48 hour period to use the one or more first biometric templates to authenticate the user 102. In another example, the access control data may indicate a specific date and time when the requestor's 130 permission to use the one or more first biometric templates will expire. In a further implementation, the access control data may also indicate a time period during which the requestor 130 is permitted to authenticate the individual using other portions of the digital identity data (e.g., one or more acquired images). In yet another implementation, the access control data may be included as part of the digital identity data, including as part of the hashed values of the first biometric templates.

In one implementation, the device 104 may (via the identity application 105 and/or the user-side SDK application 107) transmit the digital identity data (including the one or more first biometric templates), the consent data, and/or the access control data to the DRM platform 110 and/or to the requestor 130. In one such implementation, the DRM platform 110 may transmit the digital identity data and the access control data to the requestor 130, and may do so only if the consent data indicates that the user 102 consents to use of the digital identity data, including the one or more first biometric templates, by the requestor 130.

In another implementation, the one or more computing devices 131 of the requestor 130 may receive the digital identity data (including the one or more first biometric templates) and the access control data. In a further implementation, the requestor-side SDK application 133 may receive the digital identity data (including the one or more first biometric templates) and the access control data, where the requestor-side SDK application 133 may securely store the data in a memory of the one or more computing devices 131.

After the digital identity data (including the one or more first biometric templates), the consent data, and the access control data have been transmitted, the requestor 130 may initiate the identity verification process. In one implementation, the requestor 130 may initiate the identity verification process once the user 102 attempts to access the one or more resources provided by or managed by the requestor 130, such as when the user 102 arrives at the requestor's 130 location. For example, the hotel operator (i.e., the requestor 130) may initiate the identity verification process once the user 102 arrives at the hotel to check into the hotel room (i.e., the resource).

In one such implementation, the requestor 130 may invoke the requestor-side SDK application 133 via its one or more computing devices 131, where the requestor-side SDK application 133 may evaluate the access control data. In particular, the requestor-side SDK application 133 may determine if the requestor 130 is attempting to authenticate the user 102 within the time period indicated by the access control data. If so, then the authentication of the user 102 via the identity verification process may proceed.

In one implementation, the one or more computing devices 131, through the requestor-side SDK application 133, may display a prompt indicating that the user 102 is to provide one or more types of biometric data. The one or more types of biometric data may be the same as those previously provided by the user 102. In one implementation, the one or more computing devices 131 may acquire the biometric data using equipment included in and/or connected to the device 131. Such equipment may include a camera, a biometric sensor (e.g., fingerprint sensor, iris scanner, palm scanner, and/or the like), and/or any other device configured to acquire biometric data. For example, a kiosk (i.e., the computing device 131) located at the hotel may be used to acquire a fingerprint scan (i.e., biometric data) of the user 102. The kiosk may be used to operate the requestor-side SDK application 133 and may be connected to one or more servers (i.e., computing devices 131) of the hotel operator.

The requestor-side SDK application 133 may convert the acquired biometric data into one or more second biometric templates, such as through the use of the same one-way function used earlier (e.g., a one-way hash algorithm). In some implementations, a biometric template may be generated for each type of biometric data acquired from the user 102. In other implementations, a single biometric template may represent a plurality of types of biometric data acquired from the user 102.

The requestor-side SDK application 133 may then compare the one or more first biometric templates with the one or more second biometric templates. Based on the comparison, the requestor-side SDK application 133 may generate authentication data. In particular, if the comparison yields a match between the one or more first biometric templates and the one or more second biometric templates, then the authentication data may indicate that the authentication of the user 102 is successful. Further, if the comparison does not yield a match between the one or more first biometric templates and the one or more second biometric templates, then the authentication data may indicate that the authentication of the user 102 has failed. The matching of the biometric templates may be based on any technique known to those in the art, such as through an exact matching of hashed values.

In one implementation, one or more computing devices 131, through the requestor-side SDK application 133, may display the authentication data for the user 102 and/or the requestor 130. If the authentication data indicates a successful authentication, then the requestor 130 may permit the user 102 to access its one or more resources. Conversely, if the authentication data indicates a failed authentication, then the requestor 130 may deny the user 102 access to its one or more resources. In some implementations, if the authentication data indicates a successful authentication, then the requestor 130 may use other portions of the digital identity data (e.g., one or more acquired images) to further authenticate the user 102.

In another implementation, if the requestor-side SDK application 133 determines that the requestor 130 is attempting to authenticate the user 102 outside of the time period indicated by the access control data, then the application 133 may not allow the one or more computing devices 131 to acquire the biometric data, the application 133 may not convert the acquired biometric data into the one or more second biometric templates, and/or the application 133 may not compare the one or more first biometric templates with the one or more second biometric templates. In such an implementation, the requestor-side SDK application 133 may generate authentication data indicating that the authentication of the user 102 failed.

As noted above, the one or more computing devices 131 of the requestor 130 may receive the digital identity data (including the one or more first biometric templates) and the access control data, such as from the communications device 104 or from the DRM platform 110. However, in some implementations, the one or more computing devices 131 may not receive the digital identity data until the requestor 130 provides a request for the data. In such implementations, the requestor 130 may provide the request upon initiation of the identity verification process (i.e., once the user 102 attempts to access the one or more resources provided by or managed by the requestor 130). In a further implementation, the communications device 104 or from the DRM platform 110 may not transmit the digital identity data to the requestor 130 if the request occurs outside of the time period indicated by the access control data. In yet another implementation, the one or more computing devices 131 of the requestor 130 may receive the digital identity data (including the one or more first biometric templates) and the access control data from the communications device 104 through wired connection or a wireless connection that is different from the network 140.

Further, as explained above, the one or more computing devices 131 of the requestor 130 may (the requestor-side SDK application 133) be used to convert the acquired biometric data into one or more second biometric templates, compare the one or more first biometric templates with the one or more second biometric templates, and may generate authentication data. However, in another implementation, the DRM platform 110 may perform one or more of these operations via communication with the requestor 130.

Those skilled in the art will understand that implementations of the system 100 may perform more, fewer, or different operations than those described above. In addition, those skilled in the art will understand that one or more of the operations performed by the DRM platform 110 may instead be performed by the user-side SDK application 107 and/or the requestor-side SDK application 133. Similarly, those skilled in the art will understand that one or more of the operations performed by the user-side SDK application 107 and/or the requestor-side SDK application 133 may instead be performed by the DRM platform 110.

Further, although operations above are discussed with respect to one arrangement of the system 100, those skilled in the art will understand that operation may be performed for other arrangements of the system 100 and/or with additional elements. For example, though one requestor 130 is shown in FIG. 1, those skilled in the art will understand that the implementations described herein may be applied to a plurality of requestors 130, where the user 102 may provide a separate and distinct digital identity data, consent data, and/or access control data for each requestor 130. In another implementation, requestors 130 may share the digital identity data, consent data, and/or access control data.

Additionally, those skilled in the art will understand that one or more of the operations performed by the identity application 105 may instead be performed by the user-side SDK application 107, and vice versa. Further, in some implementations, the DRM platform 110 and/or the requestor-side SDK application 133 may be used to delete the stored digital identity data (including the one biometric templates) from memory if the time period indicated by the access control data has expired.

Figure 2:
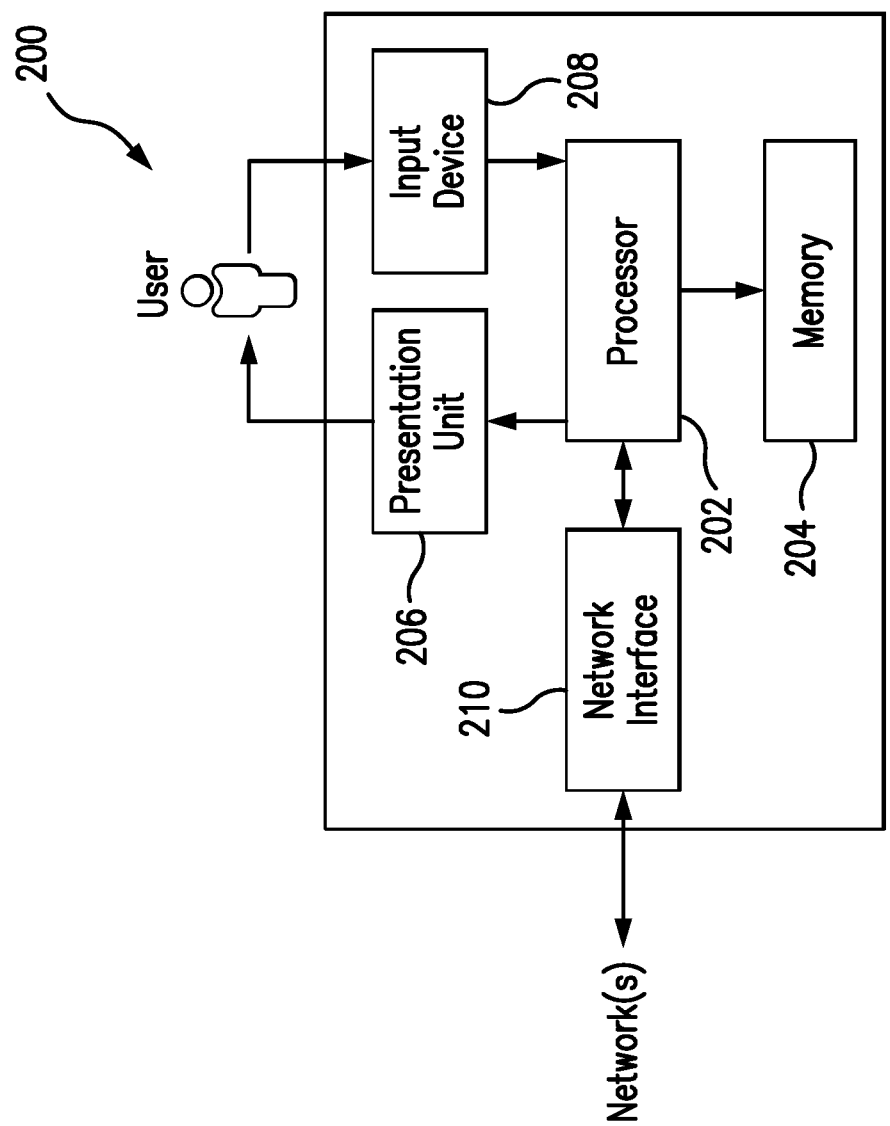
FIG. 2 illustrates a diagram of a computing device in which one or more various technologies described herein may be incorporated and practiced.
Figure 3A:
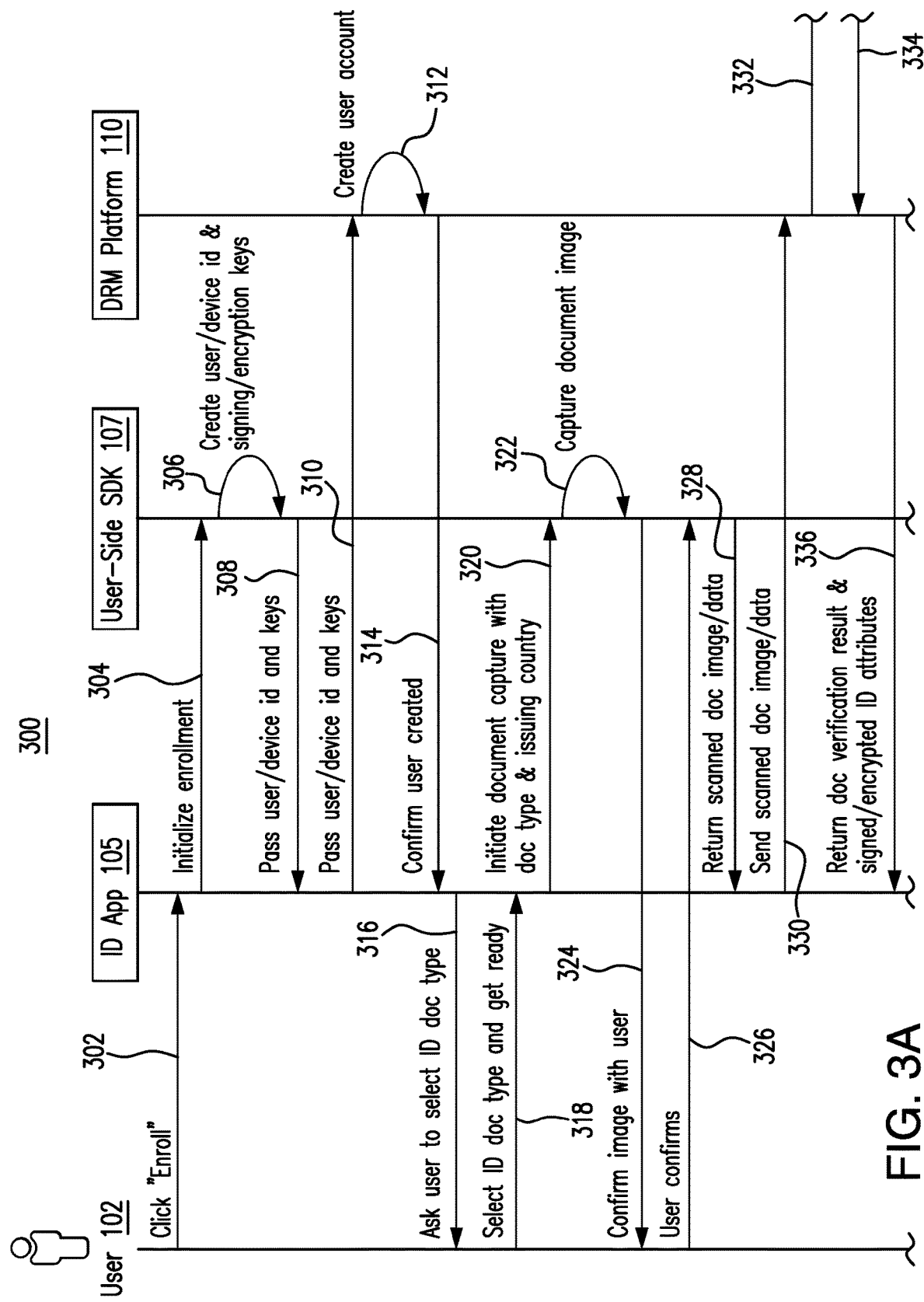
Figure 3C:
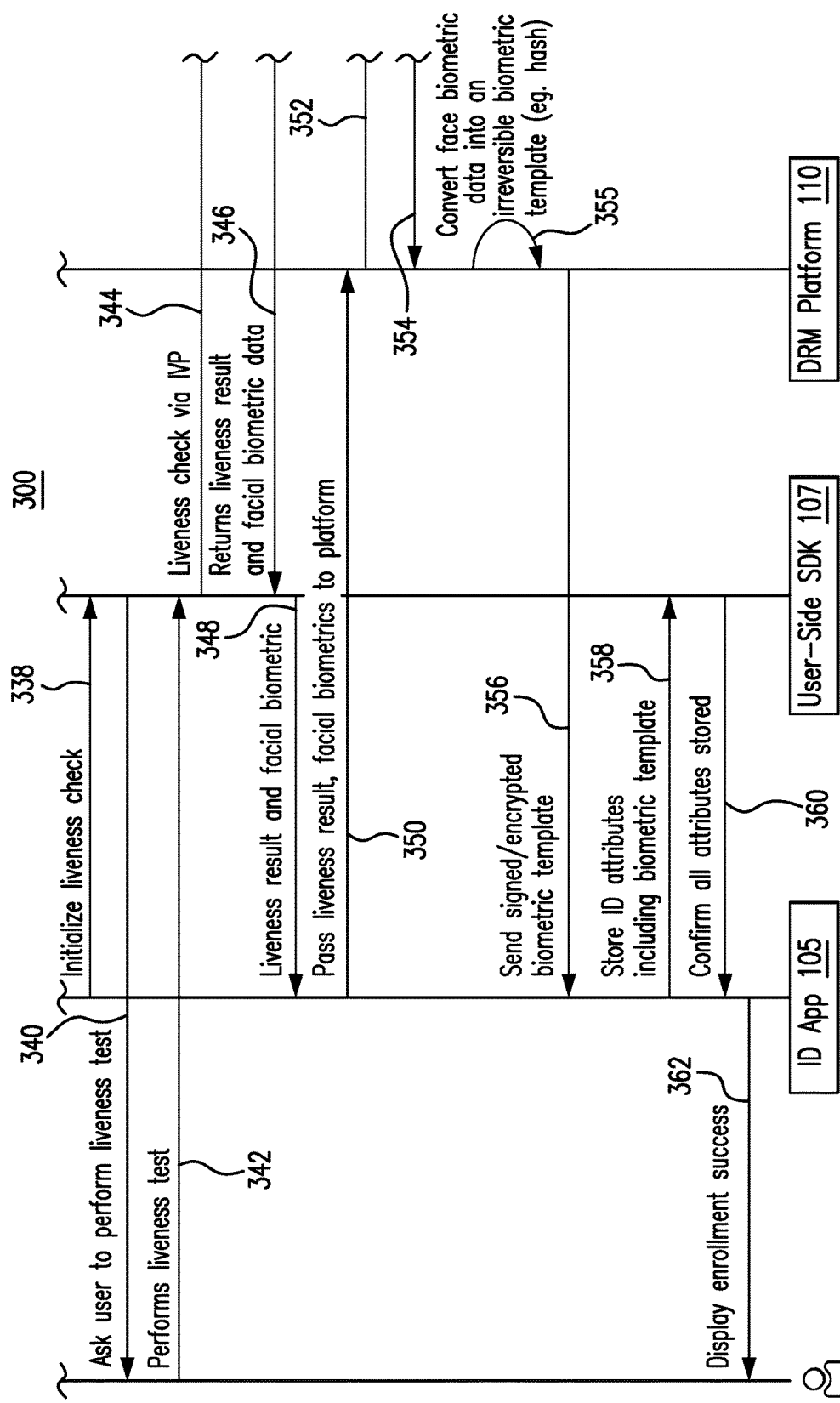
Figure 3D:
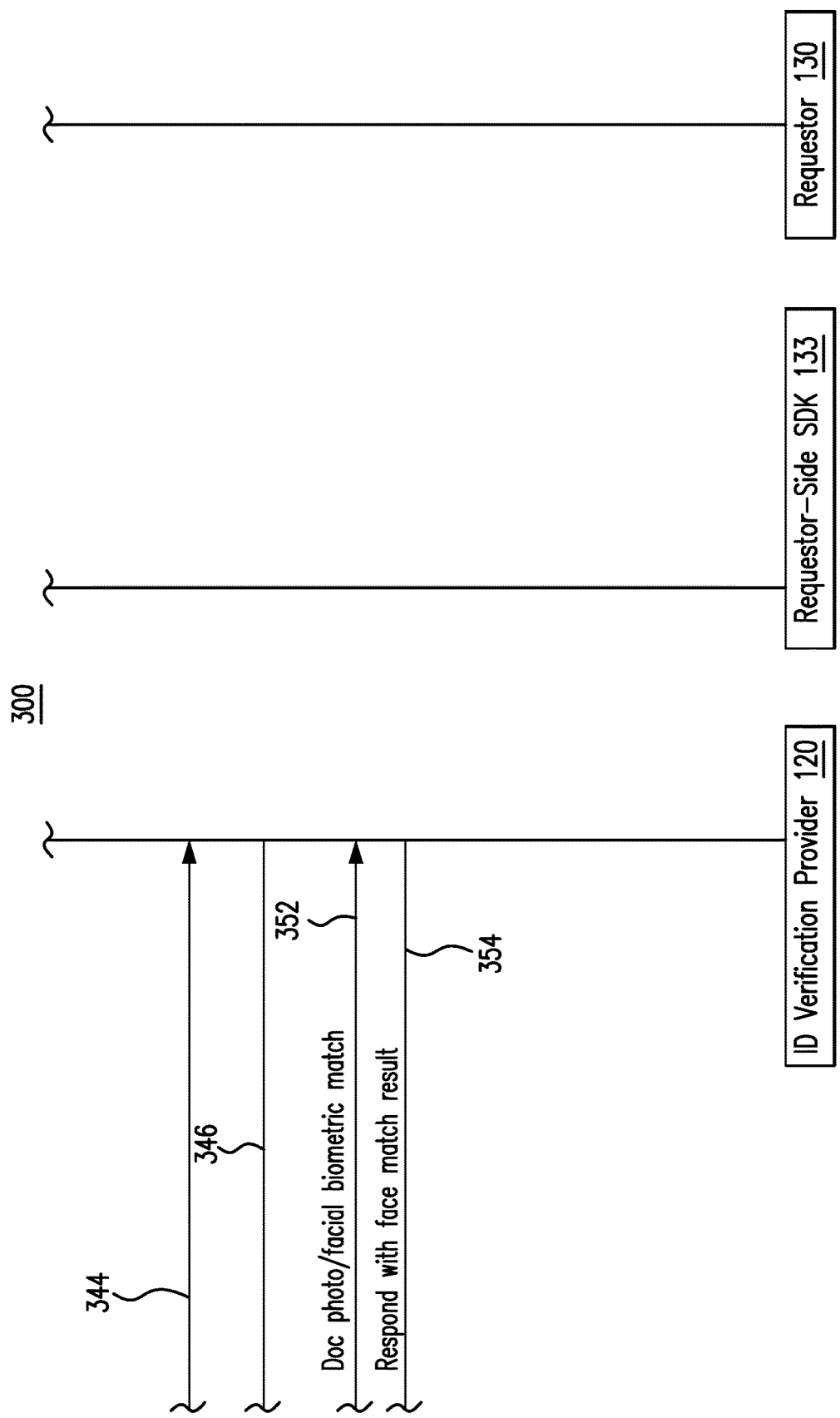
Figure 4B:
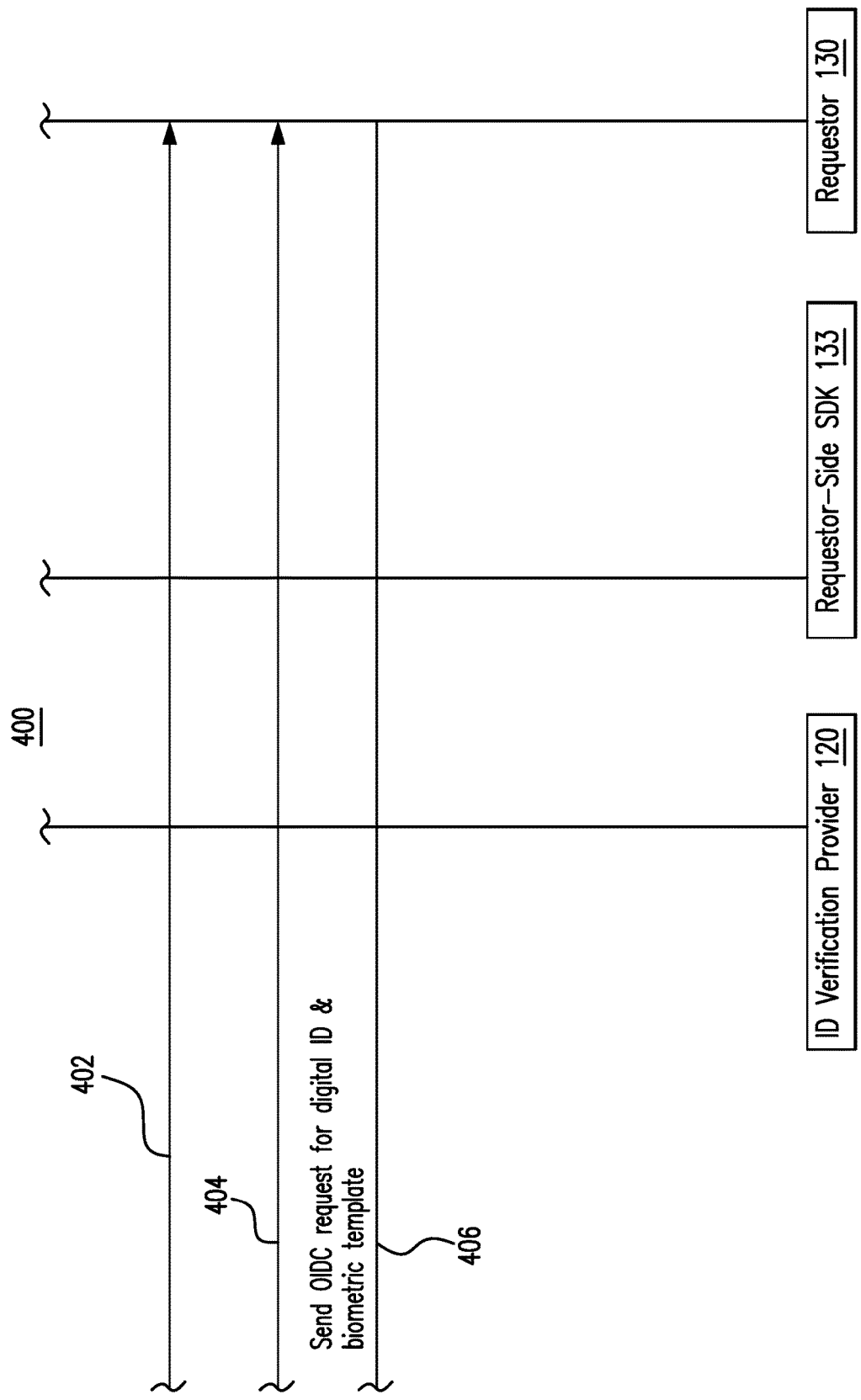
Figure 4D:
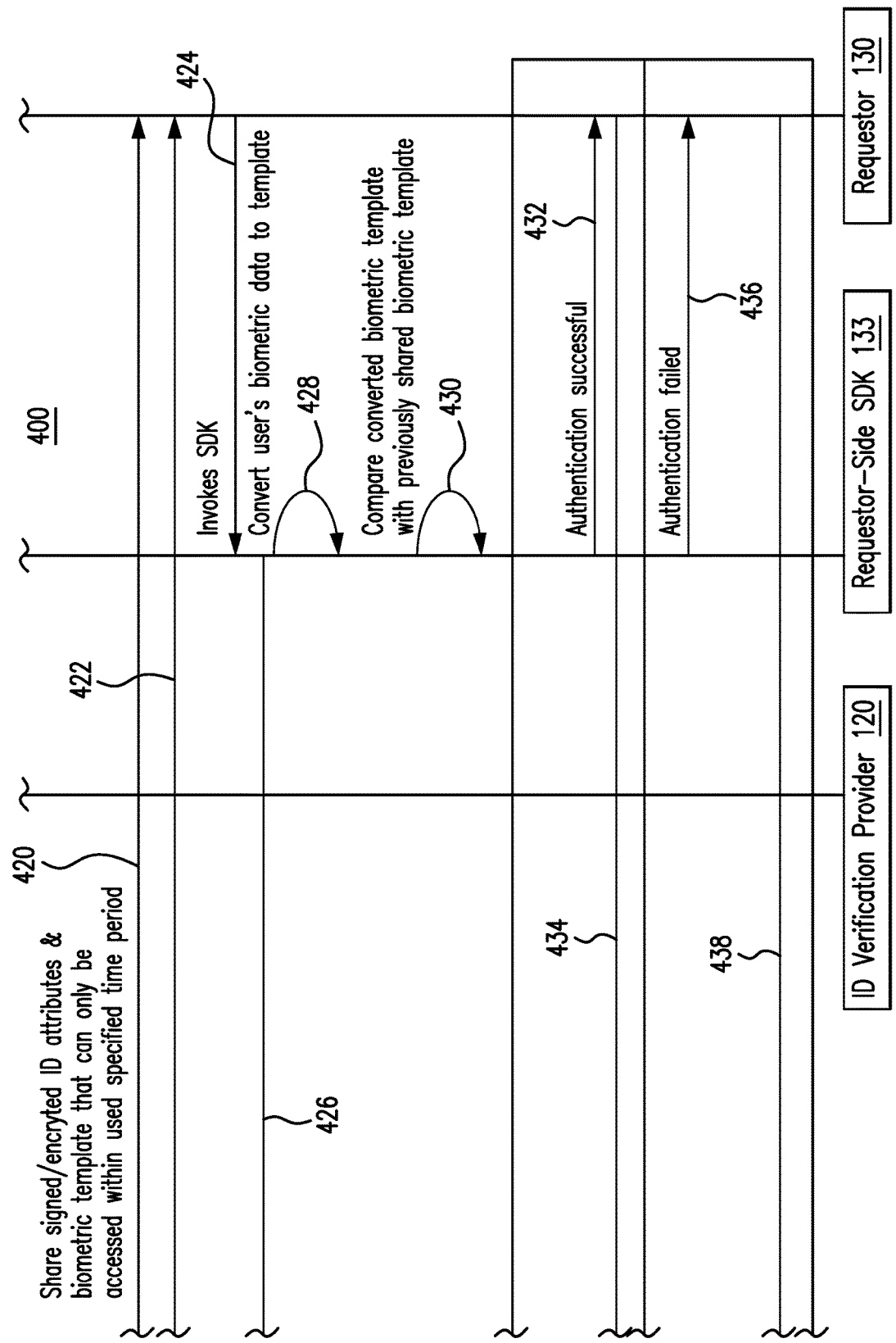

FIG. 2 illustrates a diagram of a computing device 200 in which one or more various technologies described herein may be incorporated and practiced. The computing device 200 may include, for example, one or more servers, workstations, personal computers, laptops, tablets, smartphones, personal digital assistants (PDAs), and/or the like. In one implementation, the computing device 200 may include a single computing device. In another implementation, the computing device 200 may include multiple computing devices located in close proximity or distributed over a geographic region, where the computing devices may be configured to function as described herein.

The computing device 200 can be used to implement one or more of the computing devices discussed above, such as the devices 104, 111, 121, and 131. Those skilled in the art will understand that the system 100 may use different computing devices and/or arrangements of computing devices than those described with respect to FIG. 2. In addition, different components and/or arrangements of components may be used in other computing devices.

Referring to FIG. 2, the computing device 200 may include a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, may include one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, images, private and/or public keys, public/private key pairs, identity records, certified and/or certification records, hashed data, signed data, and/or other types of data (and/or data structures) suitable for use as described herein. Furthermore, in various implementations, computer-executable instructions may be stored in the memory 204 for execution by the processor 202 to cause the processor 202 to perform one or more of the functions described herein, such that the memory 204 may be a physical, tangible, and non-transitory computer readable storage media. Such instructions may be used to improve the efficiencies and/or performance of the processor 202 and/or other computer system components configured to perform one or more of the various operations herein. It should be appreciated that the memory 204 may include a variety of different memories, each implemented in one or more of the functions or processes described herein.

The computing device 200 may also include a presentation unit 206 that is coupled to (and that is in communication with) the processor 202. However, it should be appreciated that the computing device 200 could include output devices other than the presentation unit 206 and/or the like. The presentation unit 206 may output information (e.g., verification of the user's identity, etc.), visually, for example, to a user, such as the user 102, a user associated with the requestor 130, and/or the like. Further, one or more interfaces may be displayed at computing device 200, including at presentation unit 206, to display certain information. The one or more interfaces may be defined by the identity application 105, the user-side SDK application 107, and/or the requestor-side SDK application 133, defined by websites, defined by mobile applications, and/or the like. In addition, the one or more interfaces may be used to capture images of documents, capture selfies, capture biometrics, and/or the like. The presentation unit 206 may include, without limitation, a liquid crystal display (LCD), a light-emitting diode (LED) display, an organic LED (OLED) display, an "electronic ink" display, speakers, and/or the like. In some implementations, the presentation unit 206 may include multiple devices.

In addition, the computing device 200 may include an input device 208 configured to receive one or more inputs from a user (i.e., user inputs), such as in response to prompts from the identity application 105, the user-side SDK application 107, and/or the requestor-side SDK application 133, as described above. The one or more inputs may include images of documents, images of the user 102 (e.g., biometric data), and/or the like. The input device 208 may include a single input device or multiple input devices. The input device 208 may be coupled to (and in communication with) the processor 202. The input device 208 may include, for example, a keyboard, a pointing device, a mouse, a stylus, a camera, fingerprint scanner, a touch sensitive panel (e.g., a touch pad or a touch screen, etc.), another computing device, an audio input device, or combinations thereof. In one implementation, a touch screen, such as that included in a tablet, a smartphone, or similar device, may behave as both a presentation unit and an input device. As mentioned above, the computing device may include or configured to be coupled to any equipment used to acquire one or more images of documents or biometric data. Such equipment may include a camera, a biometric sensor (e.g., fingerprint sensor, iris scanner, palm scanner, and/or the like), and/or any other device configured to acquire such data.

Further, the illustrated computing device 200 may include a network interface 210 coupled to (and in communication with) the processor 202 and the memory 204. The network interface 210 may include, without limitation, a wired network adapter, a wireless network adapter (e.g., a near field communication (NFC) adapter, a Bluetooth adapter, etc.), a mobile network adapter, and/or other devices capable of communicating to one or more different devices of the networks described herein. Further, in some implementations, the computing device 200 may include the processor 202 and one or more network interfaces incorporated into or with the processor 202. In some implementations, the computing device 200 may include global positioning system (GPS) capability, whereby the computing device 200 may determine its current geographic location, perform mapping applications, and/or the like.

FIGS. 3A-3D illustrate a sequencing diagram 300 in accordance with implementations of various techniques described herein. In particular, the sequencing diagram 300 may represent an implementation of an enrollment process by the system 100, where the system 100 may be used to facilitate an identity verification of the user 102 for the requestor 130. While the sequencing diagram is discussed with respect to FIGS. 1 and 2, those skilled in the art will understand that implementations may not limited to the operation and/or system discussed below.

As stated above, the user 102 may seek to avail himself or herself of one or more resources provided by or managed by the requestor 130. Prior to an interaction between the user 102 and the requestor 130, the user 102 may download, install, and/or activate the identity application 105 and the user-side SDK application 107 in the communications device 104. The communications device 104 (via the identity application 105) may display an enrollment prompt (e.g., an "Enroll" button) to the user 102. At 302, the user 102 may initiate an enrollment process using the identity application 105 by clicking "Enroll" on the communications device 104. At 304, the identity application 105 may communicate with the user-side SDK application 107 to initialize the enrollment process. In particular, at 306, the user-side SDK application 107 may create digital identity data for the user 102 and/or the device 104. The digital identity data may include data relating to a digital identity of the user 102, and may include a unique identifier, a unique public and private encryption key pair for the identifier, and/or the like. At 308, the user-side SDK application 107 may share the digital identity data with the identity application 105, and, at 310, the identity application 105 may transmit the digital identity data to the DRM platform 110 via the network 140, where the DRM platform 110 may create a user account corresponding to the digital identity data at 312.

At 316, the device 104, through the identity application 105, may display a prompt indicating that the user 102 is to provide one or more identification documents (i.e., proof of identity). In response, at 318, the user 102 may provide one or more inputs to the device 104 indicating a selection of type of identification document and/or an issuing country for the document. At 320, the identity application 105 may communicate to the user-side SDK application 107 to initiate the acquisition of an image for the identification document. At 322, the communications device 104, using the user-side SDK application 107, may acquire an image of the identification document using equipment included in and/or connected to the device 104. At 324, the device 104, through the user-side SDK application 107, may display a prompt requesting a confirmation from the user 102 of the acquired image. At 326, the user 102 may provide a confirmation of the image to the user-side SDK application 107.

At 328, the user-side SDK application 107 may share the acquired image with the identity application 105, where the device 104 (via the identity application 105) may transmit the acquired image to the DRM platform 110 at 330. At 332, the DRM platform 110 may transmit the image to the identification verification provider 120 for verification or validation. At 334, a verification result may be provided to the DRM platform 110. At 336, the DRM platform 110 may provide the verification result, along with signed and encrypted digital identity data, to the device 104 via the identity application 105, where the digital identity data may be stored at a memory of the device 104.

At 338, in response to a successful verification result for the acquired image, the identity application 105 may initiate a liveness check to be performed by the user-side SDK application 107. At 340, the device 104, through the user-side SDK application 107, may display a prompt requesting the user 102 to perform a liveness test. At 342, the user 102 may perform the test by providing one or more types of biometric data to the device 104. In particular, the communications device 104 may acquire the biometric data using equipment included in and/or connected to the device 104. For example, the device 104 may use a camera to capture data relating to one or more facial features (i.e., biometric data) of the user 102. In addition, the device 104 may use its equipment (e.g., a camera) to perform the liveness test of the user 102. At 344, as part of the liveness check, the biometric data may be transmitted from the device 104 (via the user-side SDK application 107) to the identification verification provider 120 for verification or validation. At 346, the identification verification provider 120 may perform the liveness check on the biometric data, and may return a liveness test result, along with the biometric data, to the device 104 (via the user-side SDK application 107). At 348, the user-side SDK application 107 may share the liveness test result, along with the biometric data with the identity application 105. At 350, in response to a successful liveness result, the device 104 (via the identity application 105) may transmit the liveness result and biometric data to the DRM platform 110.

At 352, the DRM platform 110 may transmit the biometric data to the identification verification provider 120 to verify a match between the previously-acquired image and the biometric data. At 354, the identification verification provider 120 may provide a confirmation of the match to the DRM platform 110. At 355, the DRM platform 110 convert the biometric data into a first biometric template, such as through the use of a one-way function, as described above. In one implementation, the first biometric template may be generated using a one-way hash algorithm (e.g., Secure Hash Algorithm 1 (SHA-1), MD5 message-digest algorithm, and/or the like), where the first biometric template may represent a hashed value.

At 356, the DRM platform 110 may transmit the first biometric template, which may be signed and encrypted, to the device 104 (via the identity application 105). At 358, the identity application 105 may share the first biometric template with the user-side SDK application 107. In particular, the user-side SDK application 107 may securely store the digital identity data, including the acquired image and the first biometric template, at a memory of the device 104. At 360, the user-side SDK application 107 may confirm that the digital identity data has been stored with the identity application 105. At 362, the device 104, through the identity application 105, may display to the user 102 that the digital identity data has been stored and the enrollment process was successfully completed.

FIGS. 4A-4D illustrate a sequencing diagram 400 in accordance with implementations of various techniques described herein. In particular, the sequencing diagram 400 may represent an implementation of an advance share process and an identity verification process by the system 100, where the system 100 may be used to facilitate an identity verification of the user 102 for the requestor 130. While the sequencing diagram is discussed with respect to FIGS. 1 and 2, those skilled in the art will understand that implementations may not limited to the operation and/or system discussed below.

After a successful completion of the enrollment process and prior to attempting to access the one or more resources provided by or managed by the requestor 130, the user 102 may initiate an advance share process. At 402, the user 102 may initiate the advance share process by contacting the requestor 130 using the device 104. In particular, using the device 104, the user 102 may contact the requestor 130 via one or more software-based systems (e.g., website, mobile application, and/or the like) implemented through the one or more computing devices 131. At 404, the user 102 may indicate to the requestor 130 that the user's 102 digital identity data may be provided in order to verify the user's 102 identity, such as by clicking a prompt that reads "Continue with ID (Digital Identity)." In response, at 406, the requestor 130 may request to access all or part of the digital identity data of the user 102, including the first biometric template. In one implementation, the requestor 130 may perform the request using an OpenID Connect (OIDC) framework. The requestor 130 may transmit the request to the DRM platform 110. At 408, the DRM platform 110 may contact and trigger the identity application 105 via deep linking, Quick Response (QR) code, or any other technique known in the art. At 410, the identity application 105 may retrieve the digital identity data using the user-side SDK application 107. At 412, the user-side SDK application 107 may retrieve and share the digital identity data with the identity application 105.

At 414, the device 104 may (via the identity application 105) display a prompt indicating that the requestor 130 is requesting access to the digital identity data and asking the user 102 for consent. At 416, the device 104 may receive consent data from the user 102 via an interface provided by the identity application 105, where the consent data may indicate an affirmative consent from the user 102. The device 104 may also receive the access control data from the user 102 via the interface. At 418, the device 104 may (via the identity application 105) transmit the digital identity data (including the first biometric template), the consent data, and/or the access control data to the DRM platform 110. At 420, the DRM platform 110 may transmit the digital identity data and the access control data to the requestor 130, and may do so only if the consent data indicates that the user 102 consents to use of the digital identity data, including the first biometric template, by the requestor 130.

At 422, the user 102 may attempt to access the one or more resources (e.g., a service) provided by or managed by the requestor 130, such as when the user 102 arrives at the requestor's 130 location, and which may initiate the identity verification process. At 424, the requestor 130 may invoke the requestor-side SDK application 133 via its one or more computing devices 131. At 426, the one or more computing devices 131, through the requestor-side SDK application 133, may display a prompt indicating that the user 102 is to provide one or more types of biometric data. The one or more types of biometric data may be the same as those previously provided by the user 102. In one implementation, the one or more computing devices 131 may acquire the biometric data using equipment included in and/or connected to the device 131. At 428, the requestor-side SDK application 133 may convert the acquired biometric data into a second biometric template, such as through the use of the same one-way function used earlier (e.g., a one-way hash algorithm). At 430, the requestor-side SDK application 133 may then compare the first biometric template with the second biometric template.

At 432, if the comparison yields a match between the first biometric template with the second biometric template, then the requestor-side SDK application 133 may generate authentication data indicating that the authentication of the user 102 is successful. At 434, the requestor 130 may permit the user 102 to access its one or more resources (e.g., a service). At 436, if the comparison does not yield a match, then the authentication data may indicate that the authentication of the user 102 has failed. At 438, the requestor 130 may deny the user 102 access to its one or more resources.

Accordingly, in view of the implementations discussed above with respect to FIGS. 1-4, a DRM platform may be used for identity verification. As mentioned above, the DRM platform may be used to limit an entity's access to biometric data (e.g., facial images, fingerprint scans, and/or the like) for an individual by instead providing a biometric template to the entity, where the biometric template may be generated from the biometric data via a one-way function. Further, the biometric data may be acquired using the DRM platform and the SDK applications discussed above, thereby further preventing the entity from directly accessing the biometric data. In such implementations, to further protect the biometric data/templates of individuals, a provider of the DRM platform may be selective as to the entities allowed to develop applications using the SDKs.

Moreover, the DRM platform may be used manage the entity's use of the individual's biometric template via access control data, such as by specifying a time period during which the entity is permitted to use the biometric template and/or by specifying which entity can use the biometric template. As such, the DRM platform may help an individual to control how the entity uses the biometric template, how long the entity stores the biometric data, how long the entity is able to access the biometric template, and/or whether the entity shares the biometric template with third parties (e.g., a government agency). As such, the DRM platform may facilitate the identity verification of an individual using biometric data while enabling privacy and security protections for the biometric data of the individual. In addition, the DRM platform may improve the efficiency of identity verification, such as by allowing an individual to provide access to various types of biometric data/templates to multiple entities using the digital identity data described above.

The description provided herein may be directed to specific implementations. It should be understood that the discussion provided herein is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve a developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Reference has been made in detail to various implementations, examples of which are illustrated in the accompanying drawings and figures. In the detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   receiving, from one or more user-side software development kit (SDK) of a communication device, first biometric data associated with a user, wherein the communication device comprises a processor;
   generating, by a server, one or more first biometric templates based on the first biometric data using one or more requestor-side software development kits (SDK), wherein the server comprises a digital rights management (DRM) platform;
   receiving digital identity data comprising access control data from the user, wherein the access control data comprises data indicating one or more time periods during which one or more requestors are permitted to authenticate the user using the one or more first biometric templates;
   transmitting the one or more first biometric templates and the access control data to the one or more requestors for a duration indicated by the digital identity data using the DRM platform, wherein the one or more first biometric templates are configured to be compared to one or more second biometric templates based on the access control data, and wherein the one or more second biometric templates are configured to be generated using the DRM platform based on second biometric data associated with the user;
   generating data indicating a failed authentication when the one or more requestors access the one or more first biometric templates after the one or more time periods have expired; and
   performing, by the DRM platform, one or more operations in conjunction with the one or more user-side SDKs and the one or more requestor-side SDKs, wherein the one or more user-side SDKs on the communication device are configured to be hidden from the user.

2. The method of claim 1, wherein receiving the first biometric data comprises acquiring the first biometric data using a camera, one or more biometric sensors, or combinations thereof.

3. The method of claim 1, wherein the first biometric data comprises data relating to one or more fingerprints, one or more palm veins, one or more finger veins, one or more facial features, DNA, one or more palm prints, hand geometry, one or more iris features, one or more retinal features, odor, typing rhythm, gait, voice, or combinations thereof.

4. The method of claim 1, further comprising transmitting the first biometric data to an identification verification provider for validation using the DRM platform.

5. The method of claim 1, wherein generating the one or more first biometric templates comprises converting the first biometric data to the one or more first biometric templates using a one-way function, and wherein the one or more second biometric templates are configured to be generated using the one-way function.

6. The method of claim 5, wherein the one-way function comprises a one-way hash algorithm.

7. The method of claim 1, wherein each of the one or more user-side SDKs and the one or more requestor-side SDKs comprise a set of tools used to generate one or more applications executable within or in conjunction with the DRM platform.

8. The method of claim 1, further comprising:
transmitting the one or more first biometric templates to the DRM platform;
storing the one or more first biometric templates as the digital identity data associated with the user through a user-side software development kit application associated with the DRM platform; or
combinations thereof.

9. The method of claim 1, further comprising:
receiving image data corresponding to one or more identification documents for the user; and
storing the one or more first biometric templates and the image data as the digital identity data at the DRM platform.

10. The method of claim 1, wherein authentication data is configured to be generated based on the comparison, wherein the authentication data comprises:
data indicating a successful authentication if the one or more first biometric templates match the one or more second biometric templates; and
data indicating the failed authentication if the one or more first biometric templates do not match the one or more second biometric templates.

11. A method, comprising:
receiving, by a server, one or more first biometric templates generated based on first biometric data associated with a user generated using one or more requestor-side software development kits (SDK), wherein the server comprises a digital rights management (DRM) platform;
receiving digital identity data comprising access control data associated with the user, wherein the access control data comprises data indicating one or more time periods during which one or more requestors are permitted to authenticate the user using the one or more first biometric templates;
generating authentication data based on the access control data, comprising:
receiving second biometric data associated with the user;
generating one or more second biometric templates based on the second biometric data using the DRM platform;
comparing the one or more first biometric templates and the one or more second biometric templates;
generating the authentication data based on the comparison for a duration indicated by the digital identity data using the DRM platform, and
generating data indicating a failed authentication when the one or more requestors access the one or more first biometric templates after the one or more time periods have expired,
generating one or more applications executable within or in conjunction with the DRM platform based on a set of tools, wherein the set of tools comprise each of one or more user-side SDKs and the one or more requestor-side SDKs, wherein the one or more user-side SDKs on the communication device are configured to be hidden from the user.

12. The method of claim 11, wherein generating the one or more second biometric templates comprises converting the second biometric data to the one or more second biometric templates using a one-way function, and wherein the one or more first biometric templates are configured to be generated using the one-way function.

13. The method of claim 12, wherein the one-way function comprises a one-way hash algorithm.

14. The method of claim 11, wherein generating the authentication data based on the comparison comprises:
generating data indicating a successful authentication if the one or more first biometric templates match the one or more second biometric templates; and
generating data indicating a failed authentication if the one or more first biometric templates do not match the one or more second biometric templates.

15. The method of claim 11, wherein receiving the second biometric data comprises acquiring the second biometric data using a camera, one or more biometric sensors, or combinations thereof.

16. A method, comprising:
receiving, from one or more user-side software development kit (SDK) of a communication device, first biometric data associated with a user, wherein the communication device comprises a processor;
generating, by a server, one or more first biometric templates using one or more requestor-side software development kits (SDK), wherein the server comprises a digital rights management (DRM) platform;
receiving digital identity data comprising access control data from the user, wherein the access control data comprises data indicating one or more time periods during which one or more requestors are permitted to authenticate the user using the one or more first biometric templates;
receiving a request for the one or more first biometric templates from the one or more requestors;
transmitting the one or more first biometric templates to the one or more requestors for a duration indicated by the digital identity data based on the access control data, wherein the one or more first biometric templates are configured to be compared to one or more second biometric templates based on the access control data, and wherein the one or more second biometric templates are configured to be generated based on second biometric data associated with the user; and
generating data indicating a failed authentication when the one or more requestors access the one or more first biometric templates after the one or more time periods have expired, wherein the one or more user-side SDKs are incorporated within an identity application, and wherein the one or more user-side SDKs on the communication device is configured to be hidden from the user.

17. The method of claim 16, further comprising:
receiving consent data from the user, wherein the consent data comprises data indicating an affirmative consent by the user to allow the one or more requestors to access the one or more first biometric templates; and
transmitting the one or more first biometric templates to the one or more requestors based on the consent data.

18. The method of claim 16, wherein transmitting the one or more first biometric templates comprises transmitting the one or more first biometric templates to the one or more requestors if the one or more time periods have not expired.

* * * * *